United States Patent [19]
Koskela et al.

[11] Patent Number: 5,503,066
[45] Date of Patent: Apr. 2, 1996

[54] REPLACEABLE ROTOR TINE CAP FOR BAGGING MACHINE

[75] Inventors: Michael H. Koskela, Astoria; Larry R. Inman, Warrenton; Ronald V. Garvin, Hammond, all of Oreg.

[73] Assignee: Ag-Bag International Limited, Warrenton, Oreg.

[21] Appl. No.: 395,055

[22] Filed: Feb. 27, 1995

[51] Int. Cl.⁶ ..................................................... B30B 5/00
[52] U.S. Cl. .......................... 100/144; 53/527; 141/114; 198/664; 198/676
[58] Field of Search ........................ 100/65, 144; 53/527; 141/114; 198/642, 664, 676, 677; 241/197, 300; 366/307; 56/344

[56] References Cited

U.S. PATENT DOCUMENTS

| | | | |
|---|---|---|---|
| 1,717,759 | 6/1929 | Briggs | 241/197 |
| 2,019,514 | 11/1935 | Stine | 241/197 |
| 4,799,627 | 1/1989 | Potts | 241/197 |
| 4,907,503 | 3/1990 | Ryan | 100/144 |

*Primary Examiner*—Stephen F. Gerrity
*Attorney, Agent, or Firm*—Robert L. Harrington

[57] ABSTRACT

A replaceable cap for a rotor tine of a material bagging machine. The tines extend from the rotor and propel and compress the material to be bagged. The cap fits over the leading edge of the tine to provide a replaceable wear surface. The cap has an end that engages a notch provided in the tine and is secured to the tine by a single fastener. The single fastener facilitates rapid replacement of the cap when required.

5 Claims, 2 Drawing Sheets

REPLACEABLE ROTOR TINE CAP FOR BAGGING MACHINE

FIELD OF THE INVENTION

This invention relates to bagging machines and in particular it relates to a replaceable cap for a tine of a rotor of the bagging machine.

BACKGROUND OF THE INVENTION

Bagging machines are utilized to insert foliage such as silage and the like into plastic like bags. The bagging machine has a rotor with protruding tines (teeth) that propels and compacts the material into the bag. Tines (teeth) are provided on the rotor at strategic locations for propelling the foliage uniformly into the bag.

A machine of this type is disclosed in the commonly assigned U.S. Pat. No. 5,159,877.

The tines which are fixedly attached to the rotor are subject to wear. One of the major costs is the repair or replacement of the tines when they have worn down through usage. Previously, the leading edges of the tines were clad with a hardened surface to extend the wear life. When repairs were required, the remaining cladding had to removed, such as by grinding and a new surface applied as by welding. This was a time consuming and expensive operation.

BRIEF SUMMARY OF THE INVENTION

The present invention is a replaceable cap for the tines (teeth) of a rotor of a bagging machine. The cap is arranged to be simply mounted to the tine by a single fastener. When replacement is required due to wear or other causes, the cap is simply removed and replaced by another cap.

The replaceable cap in a preferred embodiment of the present invention has an end that engages a notch provided in the tine adjacent the rotor to which the tine is attached. The extending end of the tine is arranged for fastening the opposite end of the replaceable cap to the tine by a common fastener. The replaceable cap is preferably of a hardened material to extend the wear life of the cap.

DESCRIPTION OF THE PREFERRED EMBODIMENT

Figure 1:
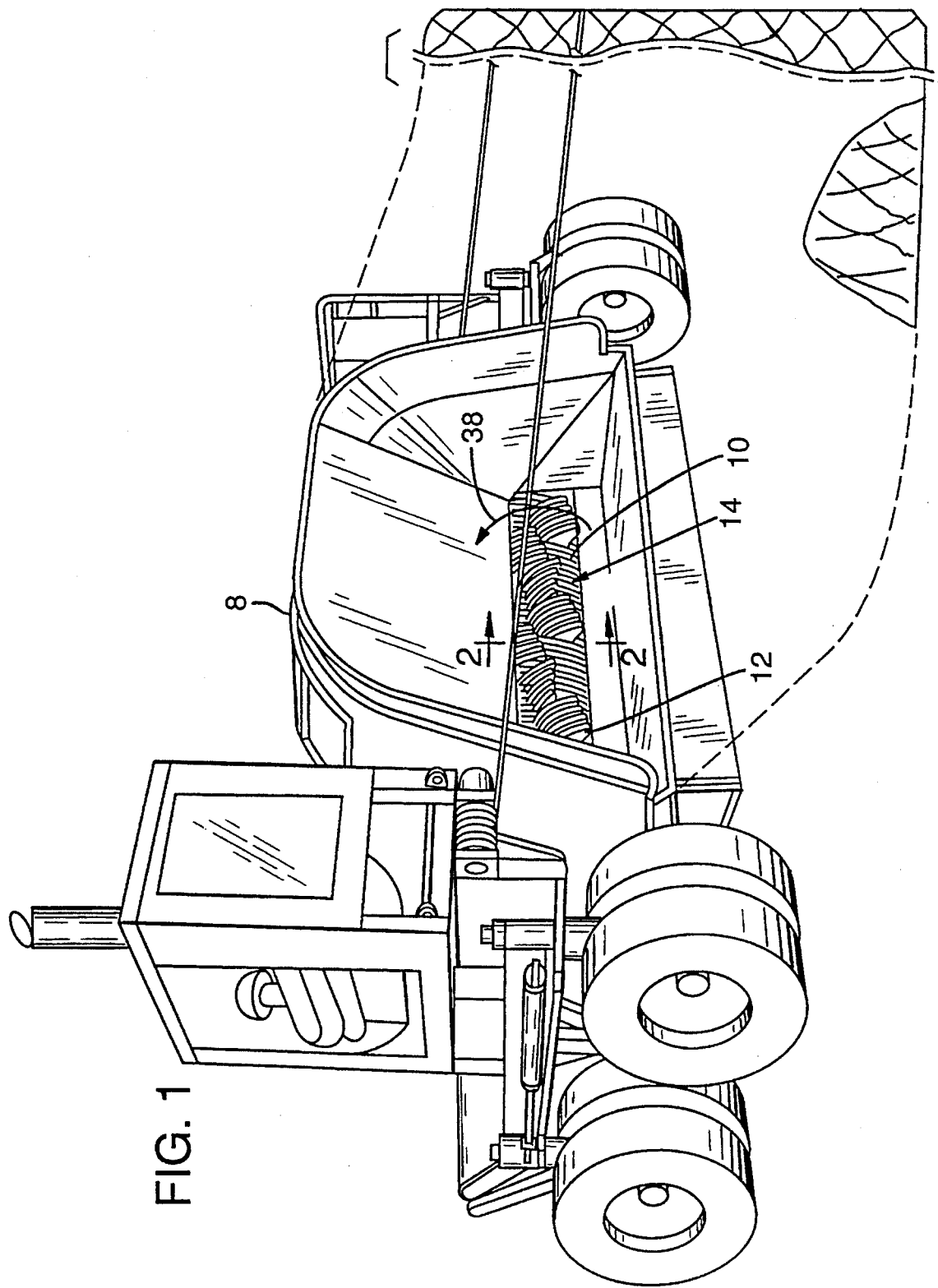
FIG. 1 is a view of a replaceable cap of the present invention installed on a material propelling tine of a rotor of a bagging machine.
Figure 2:
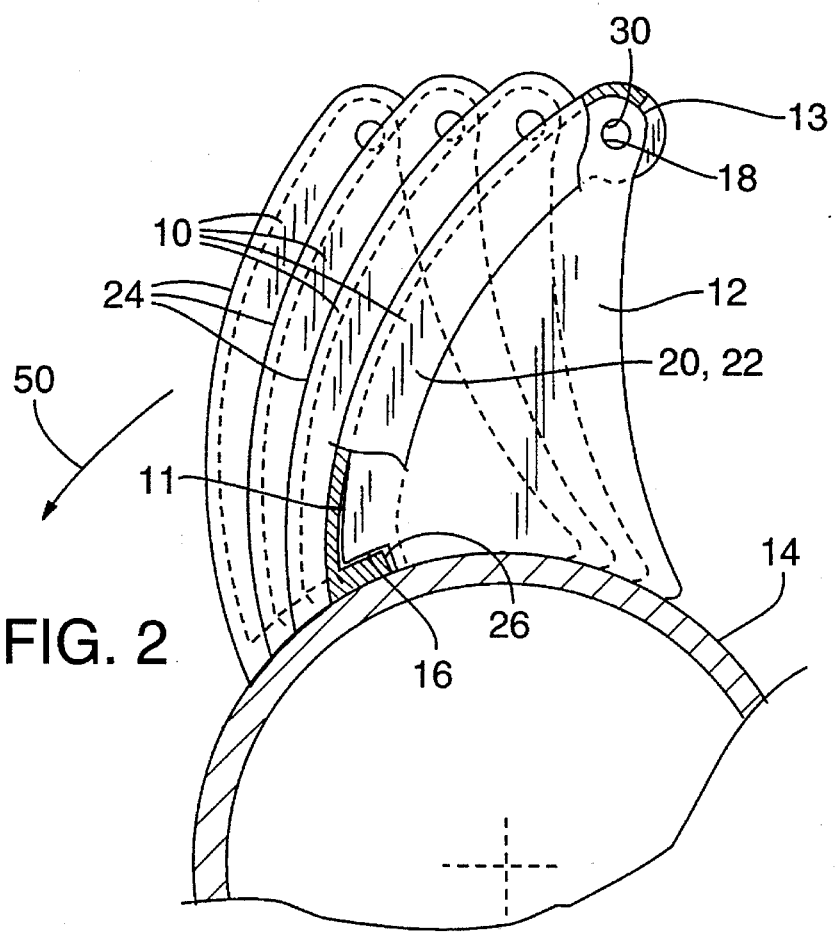
FIG. 2 is sectional view of the rotor of the machine of FIG. 1 as viewed on view lines 2—2 showing a portion of the extending rotor tines.

Refer now to FIG. 2 of the drawings which illustrates a replaceable cap 10 of the present invention fitted to the tines 12 (teeth or fins) extending from a material propelling rotor 14 of a material bagging machine 8. The cap 10 fits over the leading edge 11 of the tine 12 to protect and prevent wearing of the leading edge 11 of the tine 12. As by way of example the replaceable cap 10 is utilized on a material bagging machine such as disclosed in the commonly assigned U.S. Pat. No. 5,159,877, Inman et al, issued Nov. 3, 1992. The tines 12 extend from the rotor 14 in a select pattern and engage the material that is to be propelled and compacted into an elastic bag.

FIG. 2 illustrates a portion of the tines 12 that extend radially from and are fixedly attached to the rotor 14. The tines 12 have a leading edge 11 that normally engages the material as the rotor 14 is rotated to propel and compact the material into an elastic bag. The rotor 14 is rotated in the direction indicated by the arrow 50. A cap 10 is installed on each of the tines 12 to protect the leading edge 11 of the tines 12 from wear. When the caps 10 become worn from use, they are simply replaced by another cap 10.

The rotor 14 and the tines 12 are cooperatively arranged to accept the mounting of the cap 10. A notch 16 is provided in the leading edge 11 of the tine 12 adjacent the rotor 14 to receive an end 26 of the cap 10. The notch 16 is concentric to the surface of the rotor 14. An aperture 18 is provided in the extended end 13 of the tine 12 to facilitate fastening the cap 10 to the tine 12. The cap 10 is further illustrated in FIGS. 3 and 4.

Figure 3:
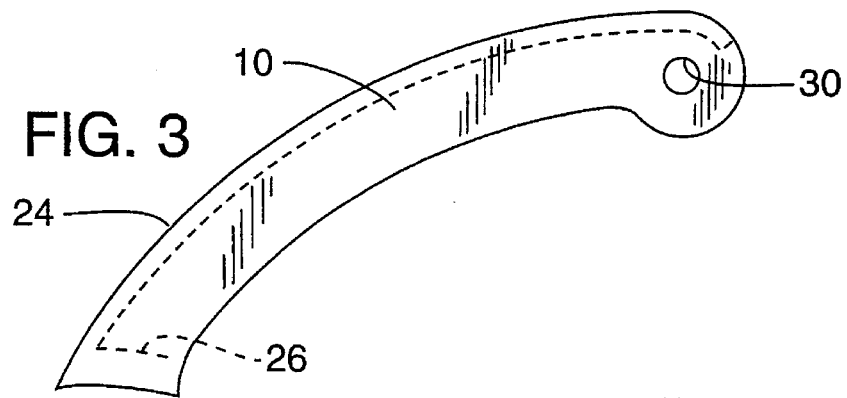
FIG. 3 is a view of the replaceable cap of the present invention arranged to be removably mounted to the rotor tines of the machine of FIG. 1; and, FIG. 4 is another view of the cap of the present invention.
Figure 4:
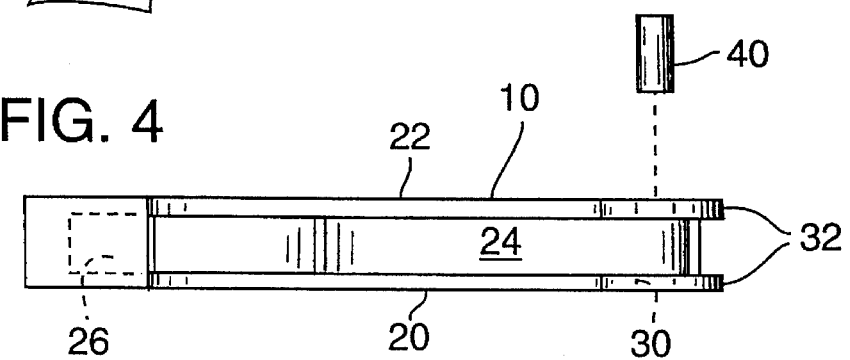

As shown in FIGS. 3 and 4, the cap 10 is basically a curved rectangular member having substantially parallel sides 20, 22 extending from a curved top 24. The top 24 has a curvature that mates with the curvature of the leading edge 11 of the tines 12 mounted on the rotor 14. An end 26 of the cap 10 which is joined to one end of each of the sides 20, 22 and one end of the top 24 is configured to fit in the notch 16 that is formed in the tine 12. As shown, the end 26 is curved to mate with the curvature of the cylindrical rotor 14 and the concentric curvature of the notch 16. An aperture (hole) 30 is provided in each of the sides 20, 22 near each of their ends 32. The apertures 30 are aligned one with the other. The spacing between the sides 20, 22 corresponds to the width of the tine 12.

Referring again to FIG. 2, a cap 10 is removably mountable to each of the tines 12 extending from the rotor 14. The end 26 of the cap 10 fits in the notch 16 formed in the leading edge 11 of the tine 12 adjacent the rotor 14. As shown the cap 10 covers the leading edge 11 of the tine 12. The sides 20, 22 of the cap 10 are adjacent the sides of the tine 12 with under side of the top 24 being in abutment with the curved surface of the leading edge 11 of the tine 12. The apertures 30 in the ends 32 of the sides 20, 22 are aligned with the aperture 18 provided in the extended end 13 of the tine 12. A common fastener 40 (See FIG. 4), such as a roll pin, is inserted into the aligned apertures 18, and 30 to secure the cap 10 to the tine 12.

The cap 10 installed on each of the tines 12 provides a replaceable wear surface that is readily renewed by simply replacing a worn cap 10 with a new cap.

Those skilled in the art will recognize that modifications and variations may be made without departing from the true spirit and scope of the invention. The invention is therefore not to be limited to the embodiments described and illustrated, but is to be determined from the appended claims.

What is claimed is:

1. A replaceable wear surface member for a forward edge of a rotor tine of a material bagging machine, said rotor tine having a curved forward edge having a leading end and a trailing end, the tine mounted to and extending from a rotor, said tine provided with a notch formed in the curved edge at the leading end immediately adjacent the rotor and said wear surface member comprising:

a curved body portion removably mounted to the tine to cover the curved forward edge of the tine, a leading end portion configured to be engageable with the notch in the tine with the body portion covering said forward edge of the tine, and a trailing end portion overlying and engaging the trailing end of the tine; and a fastener for attaching the trailing end portion of the member to the trailing end of the tine and which cooperates with the engaged leading end portion of the member to secure the member to the tine.

2. A replaceable wear surface member for a curved edge of a rotor tine having an aperture through the trailing end of the tine, said member as defined in claim 1, wherein the body portion includes a top and sides extending from the top, the leading end of the member joined to one end of each of the sides and the top, an aperture formed in each of the opposite ends of the sides and aligned with the aperture of the tine when mounted thereon, and said fastener including a pin projected through the apertures of the tine and the trailing end of the member.

3. In a bagging machine for bagging crop materials:

a rotor tine having a leading edge and sides defining opposed side edge portions, the tine mounted to and extending from a rotor, a notch formed in the leading edge of the tine adjacent the rotor;

a shaped member removably mountable to the tine to cover the leading edge of the tine and including opposed side portions covering the opposed side edge portions of the tine, one end of the member matable with the notch in the tine; and a fastener for attaching the opposite end of the member to the tine wherein the member is mountable to the tine with the one end of the member engaging the notch of the tine and the fastener fastening the opposite end of the member to the tine to secure the member to the tine.

4. In a bagging machine as defined in claim 3 wherein the fastener is provided by an extended end of the tine having an aperture formed therein and an opposite end of the member has an aperture formed therein and alignable with the aperture in the end of the tine, and a pin inserted through the aligned apertures.

5. A replaceable wear surface member for a forward edge of a rotor tine of a material bagging machine, said rotor tine having a curved forward edge having a leading end and a trailing end, the tine mounted to and extending from a rotor, said tine provided with a notch formed in the curved edge at the leading end adjacent the rotor and an aperture at the trailing end of the tine, and said wear surface member comprising:

a curved body portion removably mounted to the tine to cover the curved forward edge of the tine, a leading end portion configured to be engageable with the notch in the tine and a trailing end portion overlying and extending down the sides of the trailing end of the tine and including opposed apertures aligned with the aperture in the tine; and a pin-like fastener projected through the aligned apertures for attaching the trailing end portion of the member to the trailing end of the tine and which cooperates with the engaged leading end portion of the member to secure the member to the tine.

* * * * *